United States Patent [19]
Baylis

[11] Patent Number: 5,917,310
[45] Date of Patent: Jun. 29, 1999

[54] SPRING OPERATED CURRENT GENERATOR FOR SUPPLYING CONTROLLED ELECTRIC CURRENT TO A LOAD

[75] Inventor: Trevor Baylis, Twickenham, United Kingdom

[73] Assignee: Baylis Generators Limited, Twickenham, United Kingdom

[21] Appl. No.: 08/704,404

[22] Filed: Aug. 1, 1996

[51] Int. Cl.[6] .................................................... H02P 9/04
[52] U.S. Cl. ............................................. 322/1; 290/1 E
[58] Field of Search .................................... 322/28, 29, 1, 322/7, 8, 10, 14; 290/1 R, 1 A, 1 D, 1 E

[56] References Cited

U.S. PATENT DOCUMENTS

| | | | |
|---|---|---|---|
| 3,573,479 | 4/1971 | Reith | 290/1 |
| 3,675,113 | 7/1972 | Bader et al. | 322/28 |
| 3,937,001 | 2/1976 | Berney | 58/23 D |
| 4,332,006 | 5/1982 | Choe | 362/193 |
| 4,360,860 | 11/1982 | Johnson et al. | 362/192 |
| 4,644,246 | 2/1987 | Knapen | 320/21 |
| 4,799,003 | 1/1989 | Tu et al. | 322/29 |
| 4,939,707 | 7/1990 | Nagao | 368/64 |

*Primary Examiner*—Nestor Ramirez
*Assistant Examiner*—Nicholas Ponomarenko
*Attorney, Agent, or Firm*—Corbin & Gittes

[57] ABSTRACT

A generator device provides a controlled electric output current to a load, and comprises a source of mechanical energy, a gear train connected to the source, a generator connected to the output of the gear train, and a control circuit connected to the output of the generator to control the output level thereof, the control circuit being such that the feedback generated by the control circuit alone is sufficient to prevent uncontrolled release of the energy in the power source.

13 Claims, 13 Drawing Sheets

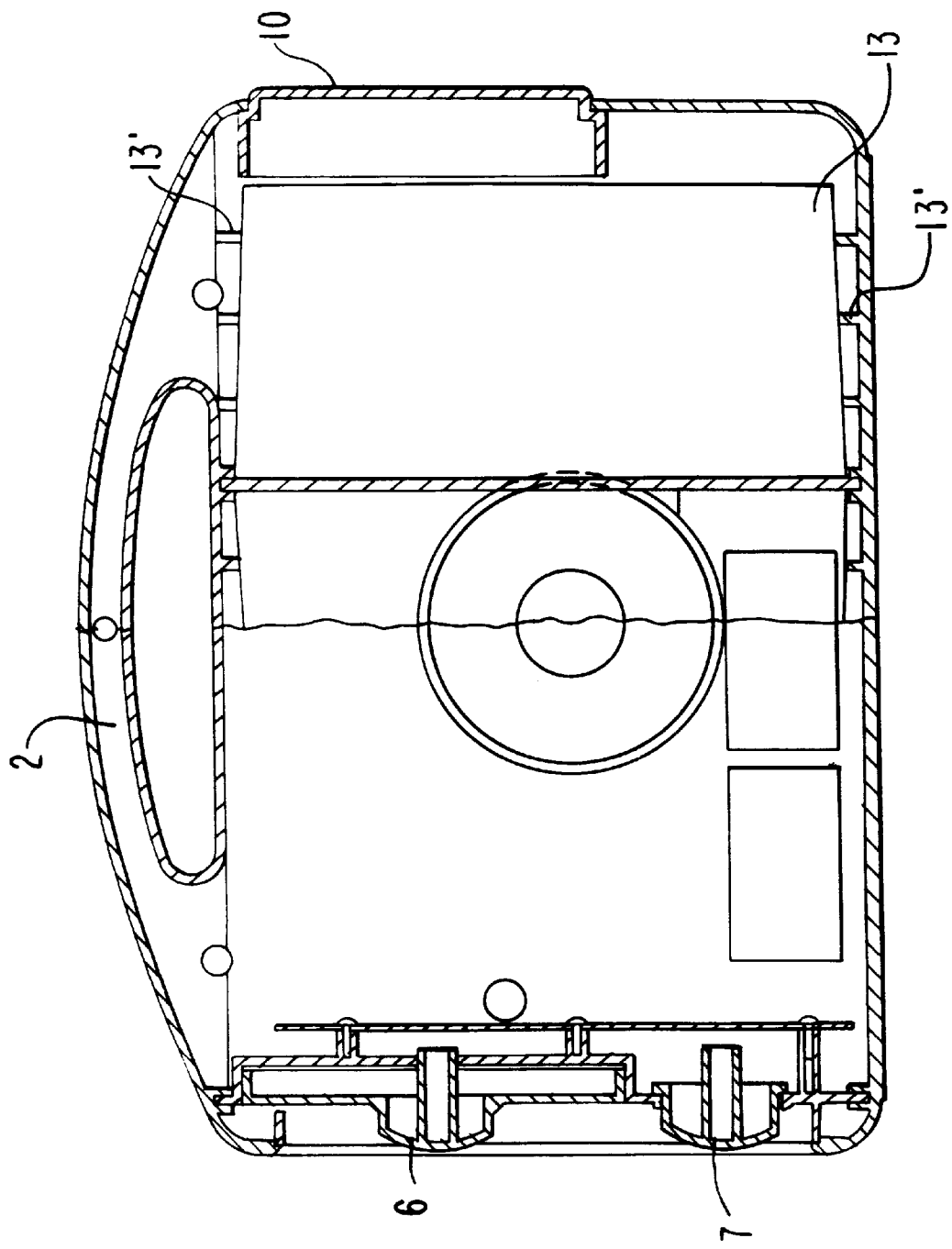

SPRING OPERATED CURRENT GENERATOR FOR SUPPLYING CONTROLLED ELECTRIC CURRENT TO A LOAD

BACKGROUND OF THE INVENTION

The present invention concerns apparatus for generating electric current. It is particularly concerned with providing a compact and reliable generator which is readily portable. Such a generator can find many fields of application one of which would be for use in providing power for portable radios in environments where there is no provision of electrical mains.

It is, of course, well-known to provide generators driven by pedal power. These, of course, require continuous effort in order to be operational. A radio having a removable spring-powered generator has been disclosed in UK Patent Specification No. 2262324 filed by the inventor of the present application. However, it proved exceptionally difficult to put into practice the basic concept described in the above UK patent specification. Part of this difficulty was caused by the inherent problem of providing a low-cost gear train which could reliably transmit the substantial amount of energy stored in a powerful spring to an electrical generator whilst ensuring that the energy in the spring was released both controllably and at the correct rate.

SUMMARY OF THE INVENTION

The foregoing problems are met by the present invention which provides a generator device for providing a controlled electric output current to a load. The generator includes a source of mechanical energy, a gear train connected to the source, a generator connected to the output of the gear train, and a control circuit connected to the output of the generator to control the output level thereof. The feedback generated by the control circuit alone is sufficient to prevent uncontrolled release of the energy in the power source.

BRIEF DESCRIPTION OF THE DRAWINGS

In order that the present invention may be more readily understood, embodiments thereof will now be described by way of example and with reference to the accompanying drawings in which:

FIG. 3 is a section through the radio of FIG. 1;

FIG. 10A is a partial view of the gear train showing the last two gears therein and the shafts that they are mounted on;

DESCRIPTION OF ILLUSTRATED EMBODIMENTS

Figure 1A:
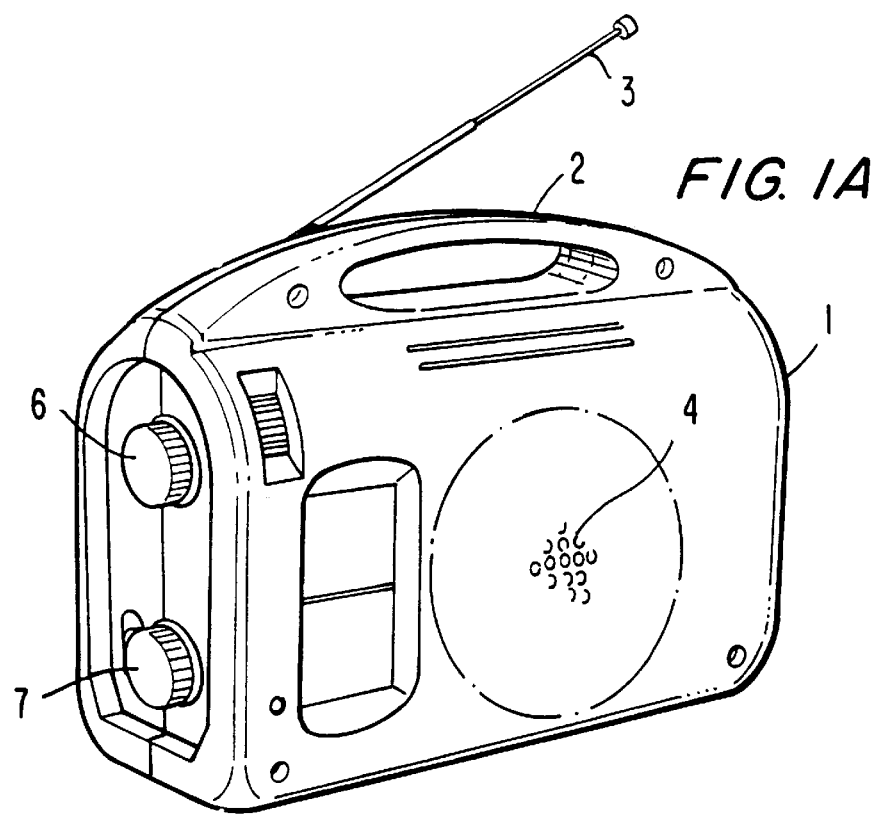
FIGS. 1A and 1B are two perspective views of a radio incorporating the present invention.
Figure 1B:
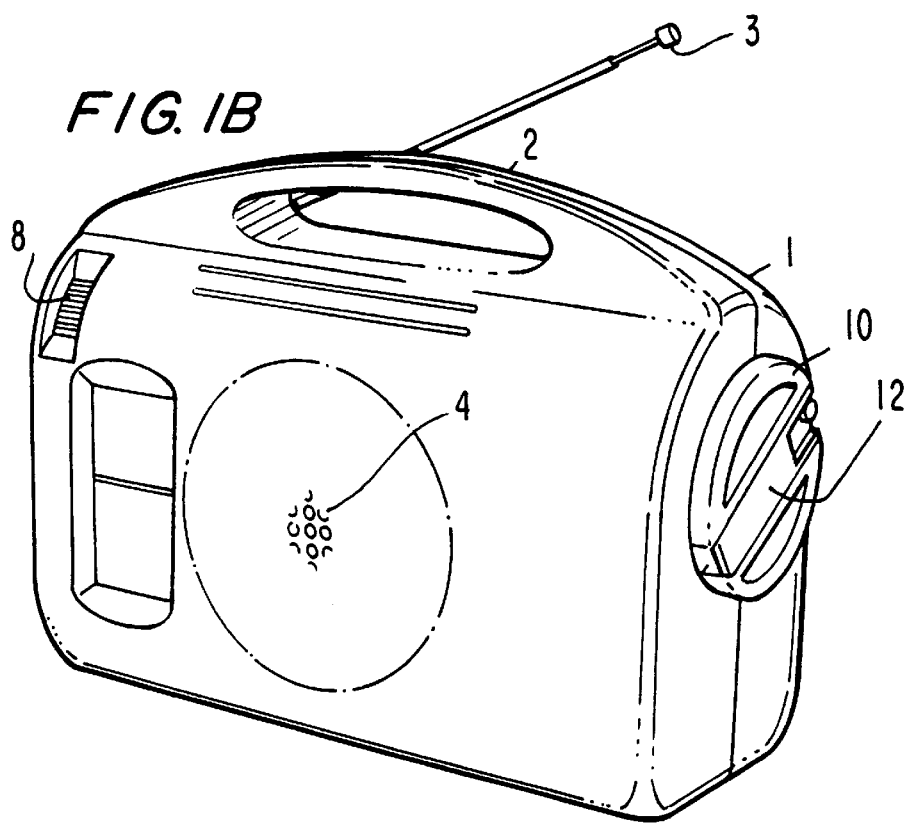
Figure 2A:
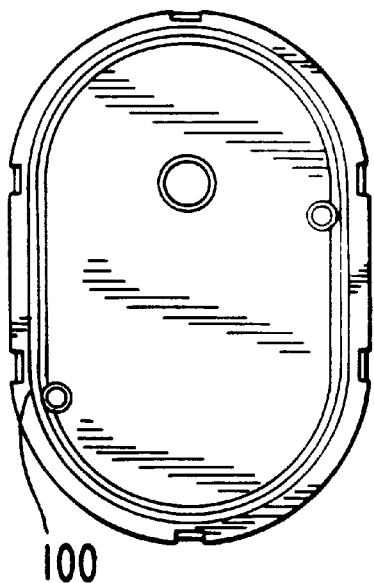
FIGS. 2A and 2B are side and plan views of a removable power generating cassette which can be mounted in the radio of FIG. 1.
Figure 2B:
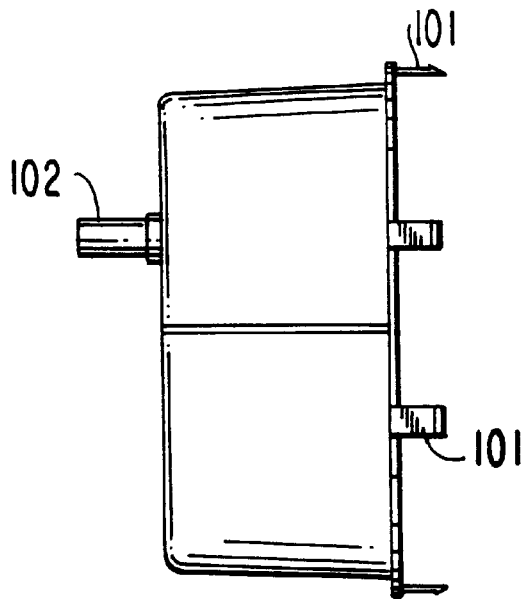

Referring now to FIGS. 1A and 1B of the accompanying drawings, these figures show a portable radio generally indicated at 1, and having a carrying handle 2 and a folding aerial 3. A loudspeaker grill is shown at 4 along with a tuning dial 5 and a station indicating panel 5'. Tuning is controlled by a control knob 6 and volume by a control knob 7. A fine tuning thumbwheel is shown at 8 and the right-hand side of the radio as viewed from FIG. 1 is formed with a rotatably mounted disc 10 having a handle 11 pivotally mounted at 12 to the rim of the disc so that the handle can be stowed when not in use in the position shown in FIGS. 2A and 2B and when in use swung outwardly so as to project at right angles from the plane of the disc. This arrangement enables a user of the radio to wind up a power source mounted within the radio in the form of a spring. This spring is contained in a removable cassette shown in FIGS. 2A and 2B of the accompanying drawings. The outer casing of the radio is made from a tough moulded thermoplastics material and is formed in two halves. These halves are held by screws inserted via openings 14. The casing can thus be opened in a simple manner to enable the cassette to be exchanged.

Referring now to FIG. 2, this shows a plan and a side view of a cassette 100 which acts as a power source for the radio shown in FIG. 1. This cassette, as will be described in greater detail later, comprises a coil spring which provides the motive power for a generator. The outer casing of the cassette is provided with clips 101 by means of which it can be clipped to the gear train, also to be described later, so that the cassette and gear train can be mounted within the body of the radio. The cassette is also provided with a spindle 102 which cooperates with the handle 11 to enable the spring to be wound when the spring within the cassette has run down.

FIG. 3 is a section through the radio and the location where the cassette is mounted is indicated in this figure at 13. As can be seen, the location for the cassette is surrounded by a plurality of ribs 13 moulded in the inner faces of the surrounding walls. These ribs insulate the cassette when mounted from external shocks and deformations of the outer casing. This is important when considering the need for very accurate alignment of the gear train.

Figure 4:
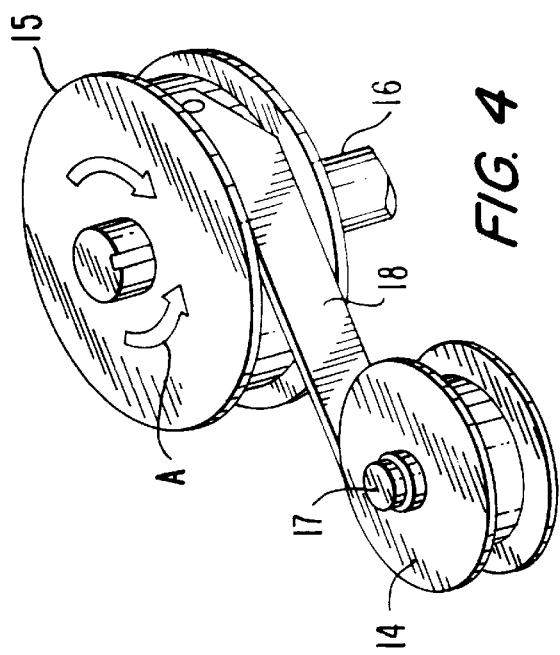
FIG. 4 is a view of a spring used in the radio of FIG. 1.

The spring within the cassette is shown in FIG. 4 of the drawings and this particular embodiment comprises a storage drum 14 and a torque drum 15 which provides an output to a torque shaft 16. The storage drum 14 is freely rotatable about a shaft 17 and a pretensioned steel band spring 18, 20 meters long, has one end fixed to the storage drum and its other end fixed to the torque drum. In operation the torque drum 15 is wound up by the winding lever constituted by disc 10 and handle 11 in the direction of arrow A and the spring 18 is wound from the storage drum onto the torque drum. By this means the spring 18 is stressed to store mechanical energy which can subsequently be delivered via the torque shaft 16. The energy stored in the spring and the torque subsequently delivered is dependent upon the spacing between the axes of the two drums 14 and 15, which axes are arranged to be substantially parallel. The energy also depends upon the relative diameters of the two drums and upon the width and thickness of the material of the spring 18. The spring 18 is a 60 turn, 10,000 cycle, 2 inch constant force spring with 1.4 to 1.1 Newton Metric storage capacity. It is of course possible to use higher power springs involving a greater number of turns.

Associated with this spring in the cassette for the radio is a gear train generally indicated at 19 for driving a DC generator 20.

Figure 5:
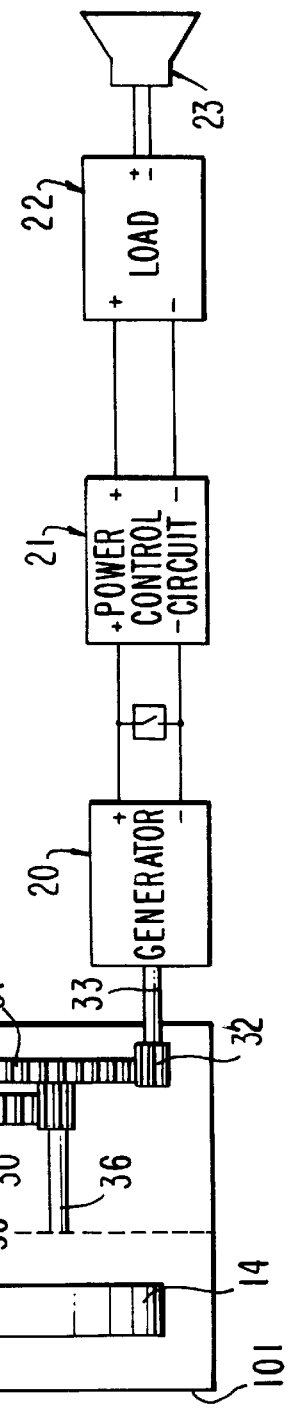
FIG. 5 is a block diagram illustrating the arrangement of the main components of the radio of FIG. 1.

This is the arrangement generally shown in FIG. 5 of the drawings which shows in diagrammatic form the storage drum 14, torque drum 15, gear train 19, DC generator 20, power control circuit 21, a basic known wireless circuit 22, and a loudspeaker 23. In this embodiment the DC generator 20 is a standard tape cassette brushed DC motor made by Mabuchi and turned in reverse to generate electricity.

Figure 6:
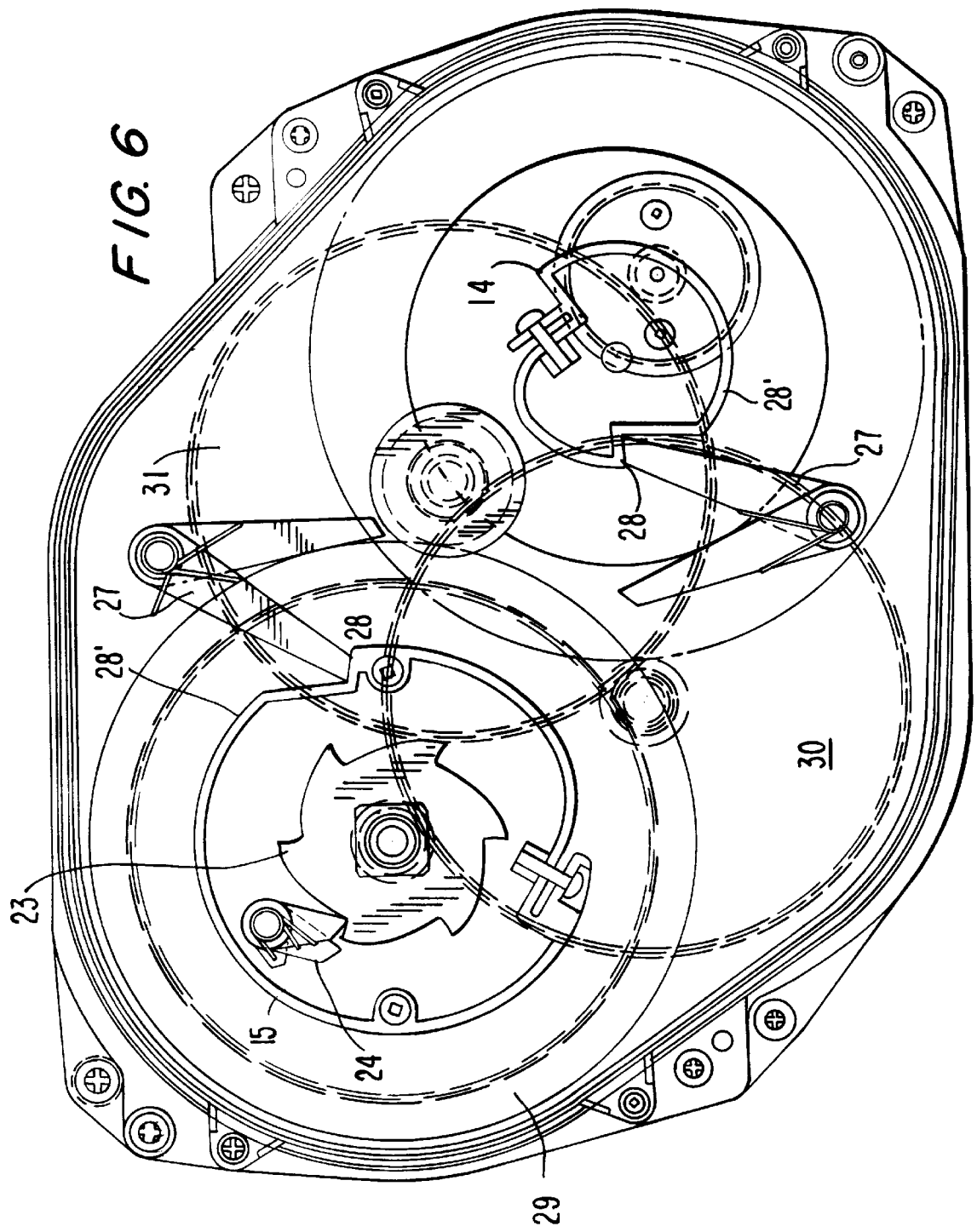
FIGS. 6 and 7 are views of a gearbox associated with the spring of FIG. 4.
Figure 7:
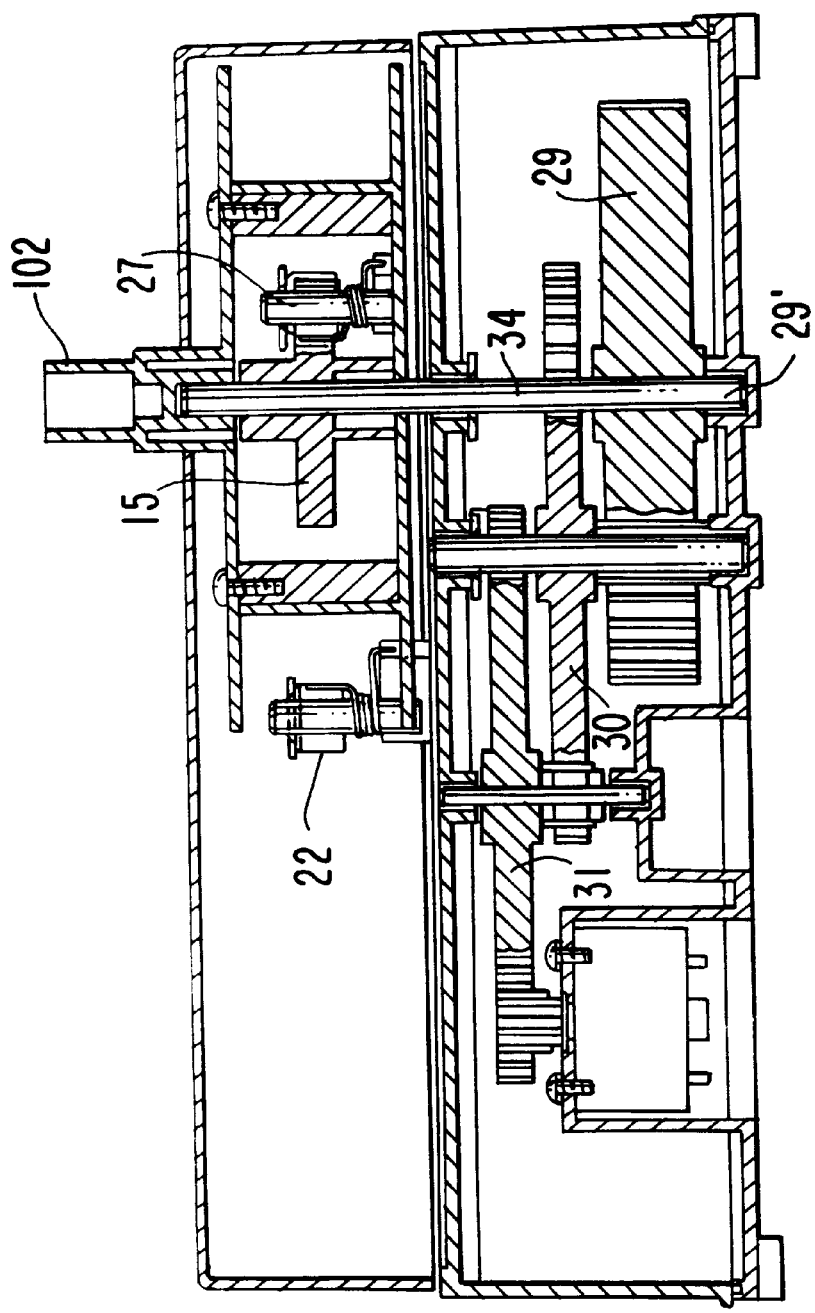

Referring now to FIGS. 6 and 7 of the drawings, these show one embodiment of the gearbox comprising the combination of the storage drum 14, torque drum 15, spring 18, and gear train 19 in the form of a single cassette which is mountable within the radio shown in FIG. 1 and shown in outline in FIG. 2.

As can be seen from these figures, the torque drum 15 is associated with a ratchet mechanism comprising a ratchet wheel 23 and a spring-loaded detent 24 to hold the spring in its stressed condition after it has been wound and also with a pair of movable spring-biased locking bars 27 the ends of which in operation engage in flats 28 provided on members 28' mounted on the shafts of the two drums. It will be appreciated that springs of the kind described contain a substantial amount of energy when fully wound and it is accordingly necessary to ensure that uncontrolled unwinding of the spring never occurs.

The gear train 19 comprises a series of plastic gears 29, 30, 31 and 32 providing an output via a shaft 33 and receiving an input from the torque shaft 16 of torque drum 15. The gears are mounted on stainless steel shafts 34, 35 and 36 and together provide a gear ratio which converts one rotation of the torque shaft into approximately 1000 revolutions. The primary drive gear 29 is directly connected to the torque drum 15 and transfers up to 1.4 Nm of load to the first compound gear 29. This gear is free spinning on a steel axle 29' and drives an identical gear 30 which in turn drives an output gear 31 driving a gear 32 on the generator to reduce friction shaft.

The output of the generator 20, as already explained, is connected to a power control circuit 21.

Figure 8:
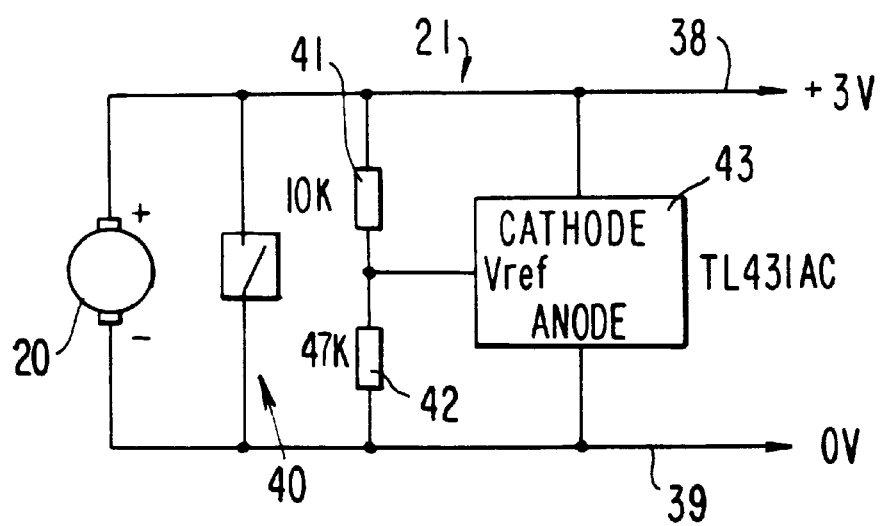
FIG. 8 is an electric circuit diagram showing an embodiment of the power control circuit of the radio of FIG. 1.

A first embodiment of such a power control circuit is shown in FIG. 8.

Thus the output of generator 20 is taken via a pair of rails 38, 39 across which are firstly connected the terminals of a power on/off switch 40 the contacts of which are closed when the radio is off.

A pair of resistors 41, 42 provide a voltage reference to a Zener diode 43 (component number TL431AC) so as to provide a stabilised output voltage of 3 volts.

It has surprisingly been found that although the power stored in the spring 18 is very substantial because of the very high gear ratio of the gear train 19 the feedback from this voltage control arrangement is adequate to control the unwinding of the spring without the addition of any other control mechanism or output choke.

Thus this circuit limits the maximum speed with which the spring can uncoil under low load conditions by applying a fixed level voltage clamp.

Figure 9:
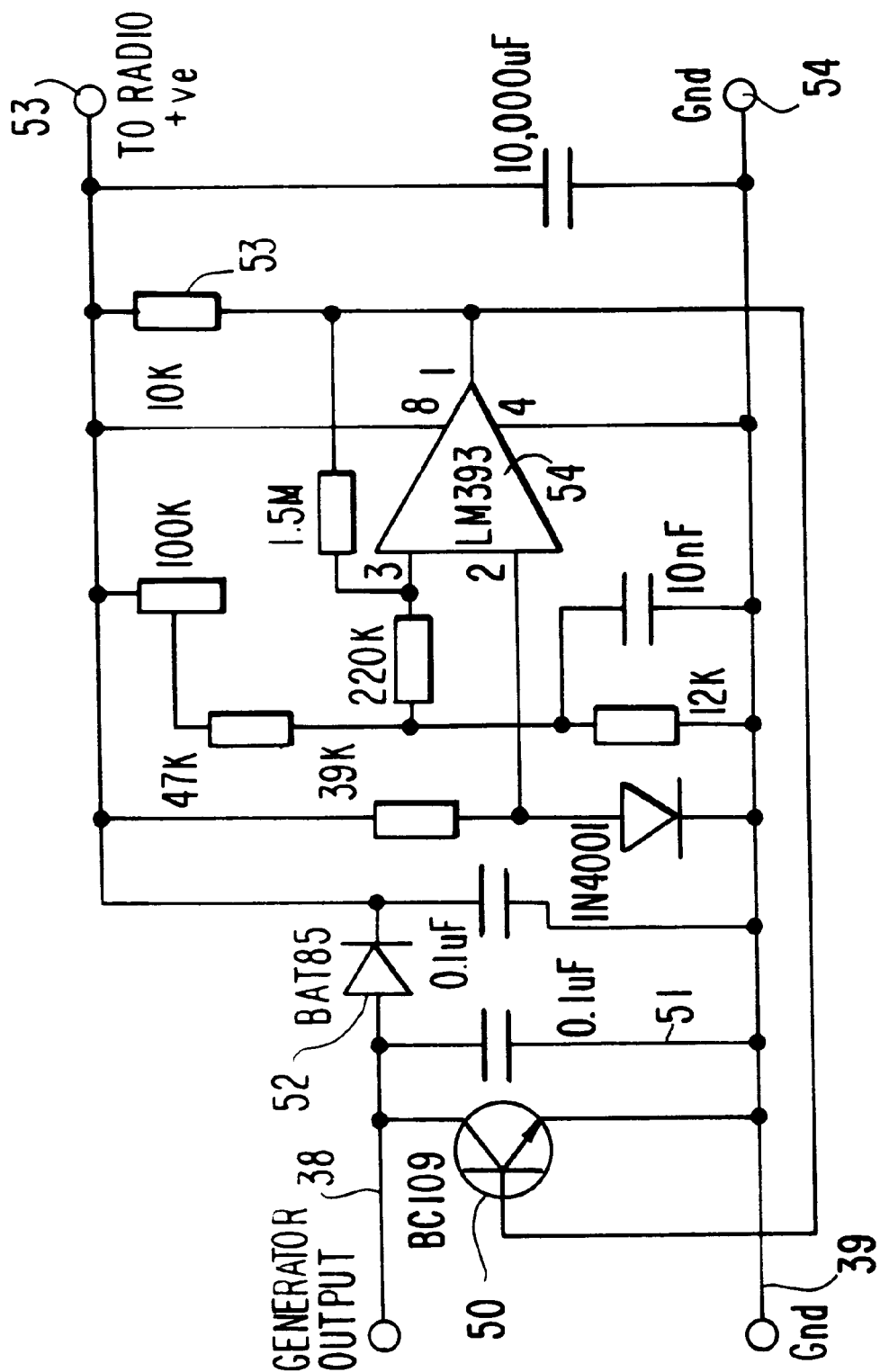
FIG. 9 is another more detailed circuit diagram of a second embodiment of a power control circuit.

FIG. 9 of the drawings shows a second embodiment of a more sophisticated circuit designed to conserve, to a greater degree, the energy stored in the spring 18. This circuit actually does act to control the unwinding of the spring by the application of an electronic brake. The circuit comprises a transistor 50 mounted between the output rails of the generator, a capacitor 51 mounted in parallel with the transistor and a first Zener diode 52. The final output voltage is applied to a positive terminal 53 and a ground terminal 54 and positive rail 38 is connected to the base of transistor 50 via a resistor. An operational amplifier 54 is connected between the rails 38 and 39 and the arrangement of the circuit is such that when the applied voltage rises above a certain predetermined level, transistor 50 is switched on and the generator output is shorted. The speed of a generator is severely reduced and this allows energy stored in the spring 18 to be conserved by clamping the output of the source of mechanical energy. When the applied output voltage falls below a certain level the transistor 50 is switched on again and the generator motor is released to provide power to the storage capacitor 56. This capacitor is a 10,000 $\mu$F capacitor. The cycle repeats as the applied output voltage rises and falls. This circuit makes use of the fact that the output volume of a radio does not vary significantly with the applied voltage, once the applied voltage is above a certain level.

Figure 10A:
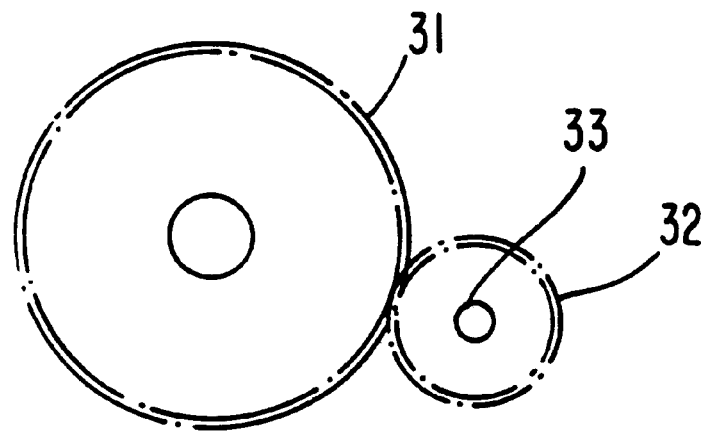
Figure 10B:
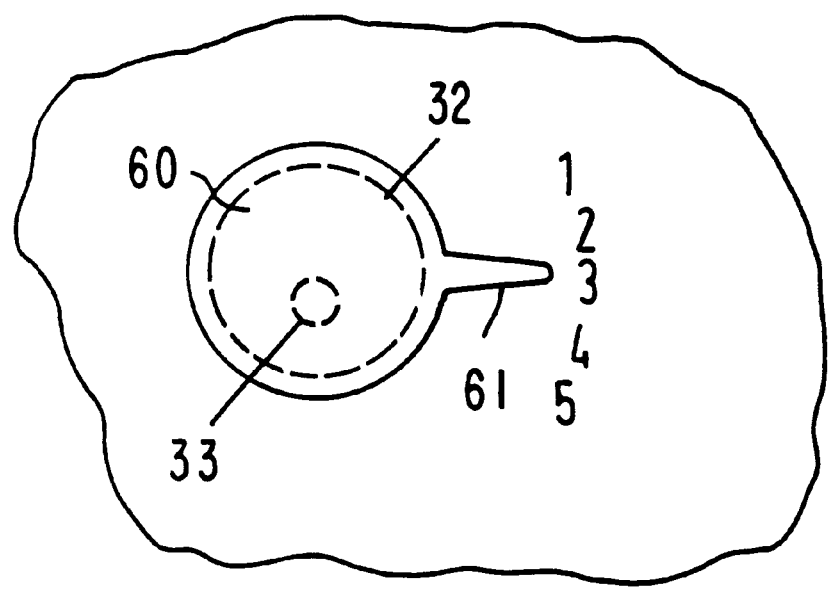
FIG. 10B illustrates a pointer, attached to the same shaft that the final gear is attached to, for adjusting the periphery of the final gear with respect to the gear train driving it and further illustrating the adjustment scale.
Figure 10C:
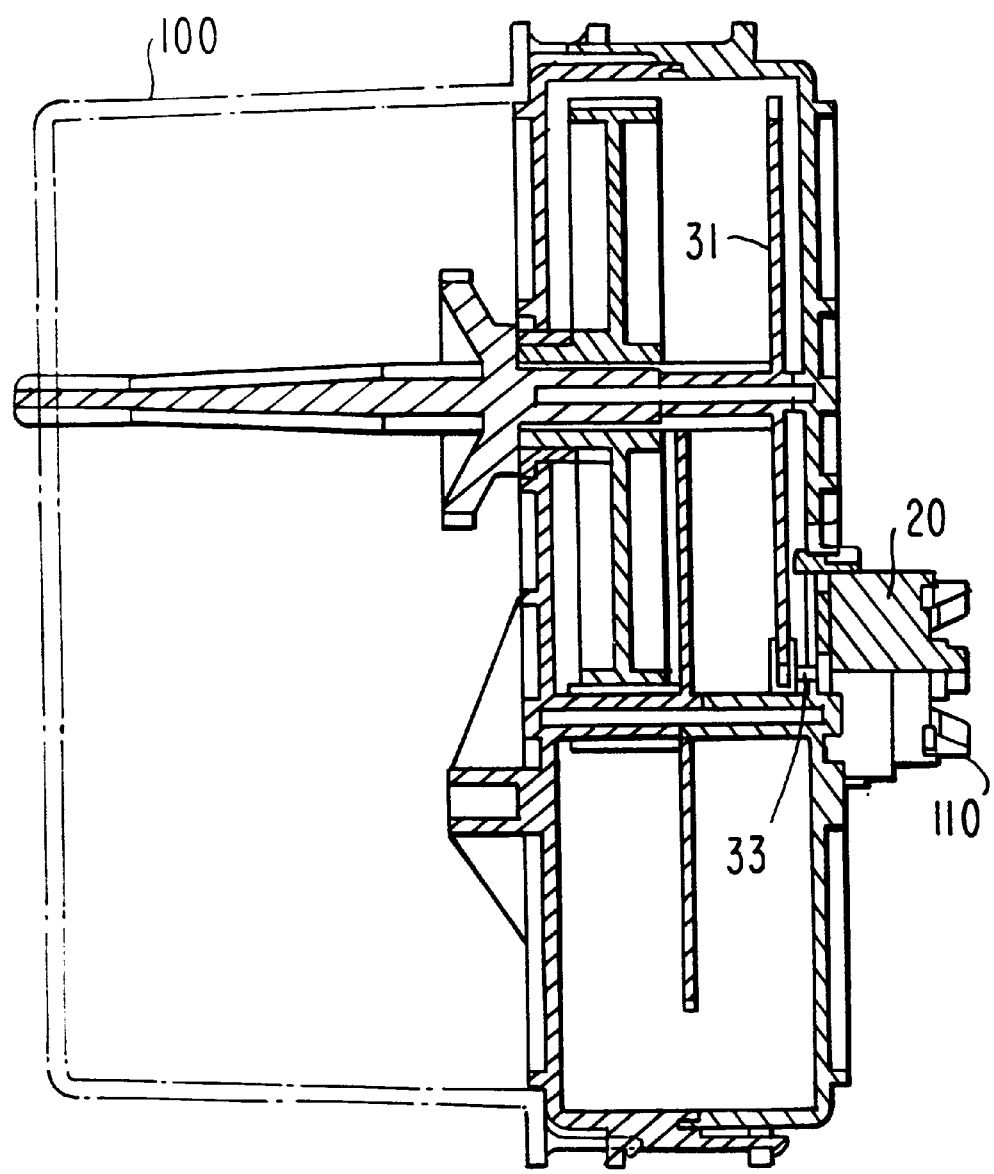
FIG. 10C illustrates a sectioned side view of fine tuning arrangement described in FIGS. 10A and 10B along with the generator mounted thereto.

One of the reasons that the voltage control circuits described with reference to FIGS. 8 and 9 are capable of controlling the spring 18 is the very high gear ratio provided by the gear train. However, this advantage also causes the problem that it is very easy to stop the output of the gear train by providing a slight impediment in the meshing of, for example, the output gear train with the final train driving it. A feature of the present embodiment deals with this problem by the arrangement shown diagrammatically in FIGS. 10A, 10B and 10C of the drawings. The three parts of this figure show a fine tuning arrangement for ensuring that the final gear wheel 33 meshes exactly with the gear 31 driving it. Thus the shaft 33 on which the final gear is mounted is itself mounted in a rotatable shaft 60. Shaft 60 itself carries a pointer 61 movable relative to a scale 62. Shaft 33 is mounted very slightly off-centre with respect to shaft 60 so that by rotating shaft 60 the actual periphery of the gear train mounted on shaft 33 can be minutely adjusted with respect to the much larger gear train driving it. The degree of offset is exaggerated in this illustration. In this way, the output drive train from the gearbox can be finely tuned for each individual generator cassette. The junction fine tuned in this manner is shown at 5 in FIG. 5. Such fine tuning substantially improves output performance and also reduces the actual noise level. FIG. 10C is a section through the fine tuning arrangement and shows the generator 20 mounted in clips 110.

Figure 13:
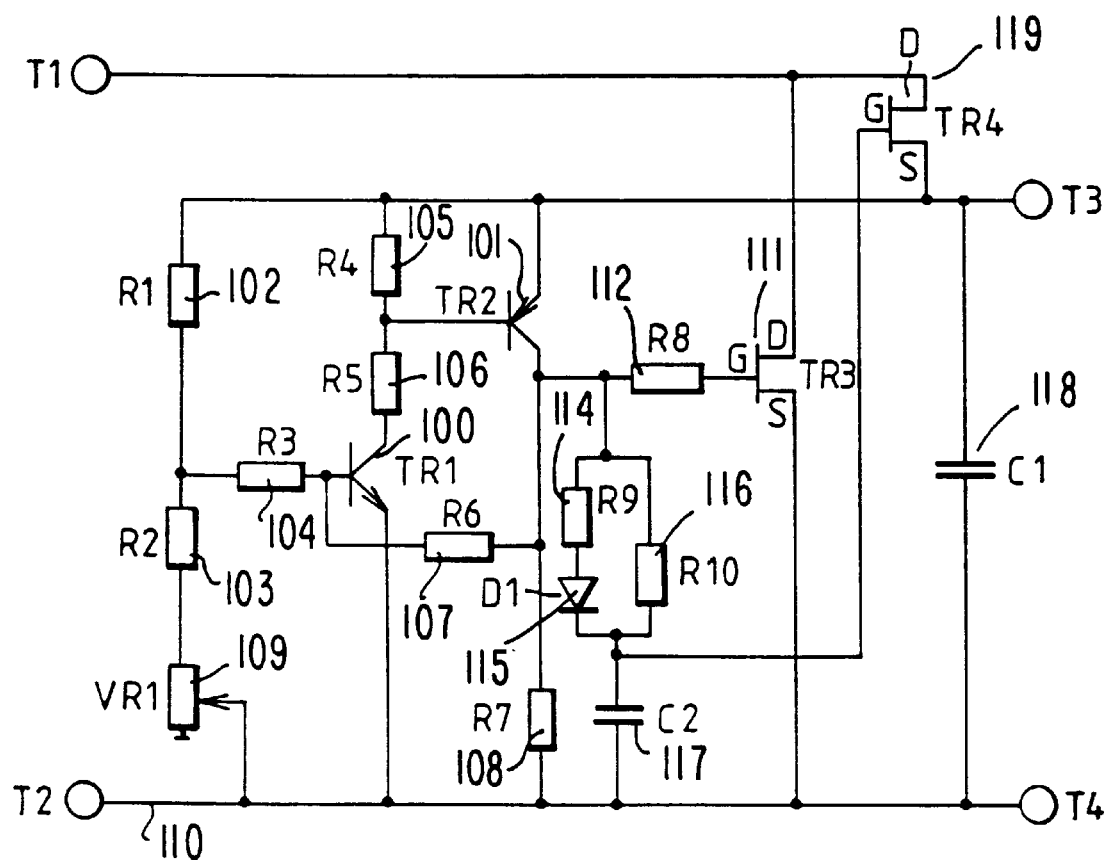
FIG. 13 is a circuit diagram of a third embodiment of a power control circuit.

FIG. 13 shows a still more efficient form of control circuit for economising expenditure of energy by the spring 18.

The circuit shown in FIG. 13 has input terminals T1 to T2 connected to the output of the generator 20, and output terminals T3 and T4. It also has four main functional blocks. The first is a voltage trigger which acts with hysteresis. The voltage trigger is made up by the components associated with transistors 101, 101'. These components comprise resistors 102–108 and a variable resistor 109. The voltage trigger circuit monitors the supply rail 110 and provides an output of almost 0 volts for low supply rail voltages and an output at almost the rail voltage for high rail voltages. The actual switching voltage levels are set by means of the variable resistor 109. The difference between the high and low voltage points is the hysteresis, which is fixed, in the present embodiment, at about 0.5 volts.

The next functional block is a clamp for providing an electronic clamp which slows down, as far as possible, the spring unwinding. This is effected by applying a short circuit to the generator output. Releasing the short circuit allows the generator to run at a speed dictated by the power being taken by the radio. Transistor 111 is connected to the voltage trigger via a resistor 112 and to the input terminals T1 and T2 of the circuit so that when it conducts power is supplied to the output and as will be described to charge a storage capacitor.

The third functional block is the capacitor 113 which provides the power storage in the intervals when the generator is switched off by the clamp circuit which has just been described. Capacitor 113 provides power to the control circuit as well as to the radio. It is charged under the control of transistors 101, 101' via a circuit which comprises a resistor 114 in series with a diode 115 and a parallel resistor 116. A capacitor operates by smoothing the rapid discharge of capacitor 113 following unclamping so that the output to the radio remains more stable.

The fourth functional block is a power switch which includes a transistor 117 which connects the generator output taken from inputs T1 and T2 to capacitor 113. This transistor conducts until the rail voltage, which is equivalent to the voltage on capacitor 113, reaches a predetermined level as detected by the trigger circuit. At this point transistor 117 is switched off by the output of the circuit consisting of resistors 114, 116, diode 115 and capacitor 117. When transistor 117 is turned off the radio now takes its power solely from the storage capacitor 118. When the capacitor voltage falls to a predetermined level, again as detected by the trigger circuit, the generator clamp is released and transistor 119 is opened again so as once more both to recharge the capacitor and supply power to the radio.

The values of the components of this circuit are as follows.

RESISTORS
102 330K,
103 27K,
104 168K,
105 1N,
106 100K,
107 4M,
108 470K,
112 1K,
114 1K,
116 1M.
TRANSISTORS
100 BC184L,
101 2N2907,
111 BSS98,
119 RFP10PO3L.
VARIABLE RESISTOR
109 50K.
CAPACITORS
118 22000 µF6.3 volts,
117 0.1 µF diode,
115 1N4194.

It will be appreciated that these figures can be varied.

It has been established that even at high volumes this circuit will act to stop the spring unwinding during significant pauses. Its action is apparent from the lowest volumes to reasonably high ones. Compared to the simple circuit disclosed in FIG. 8, the control circuit of this embodiment can give an effective doubling of playtime.

Figure 11:
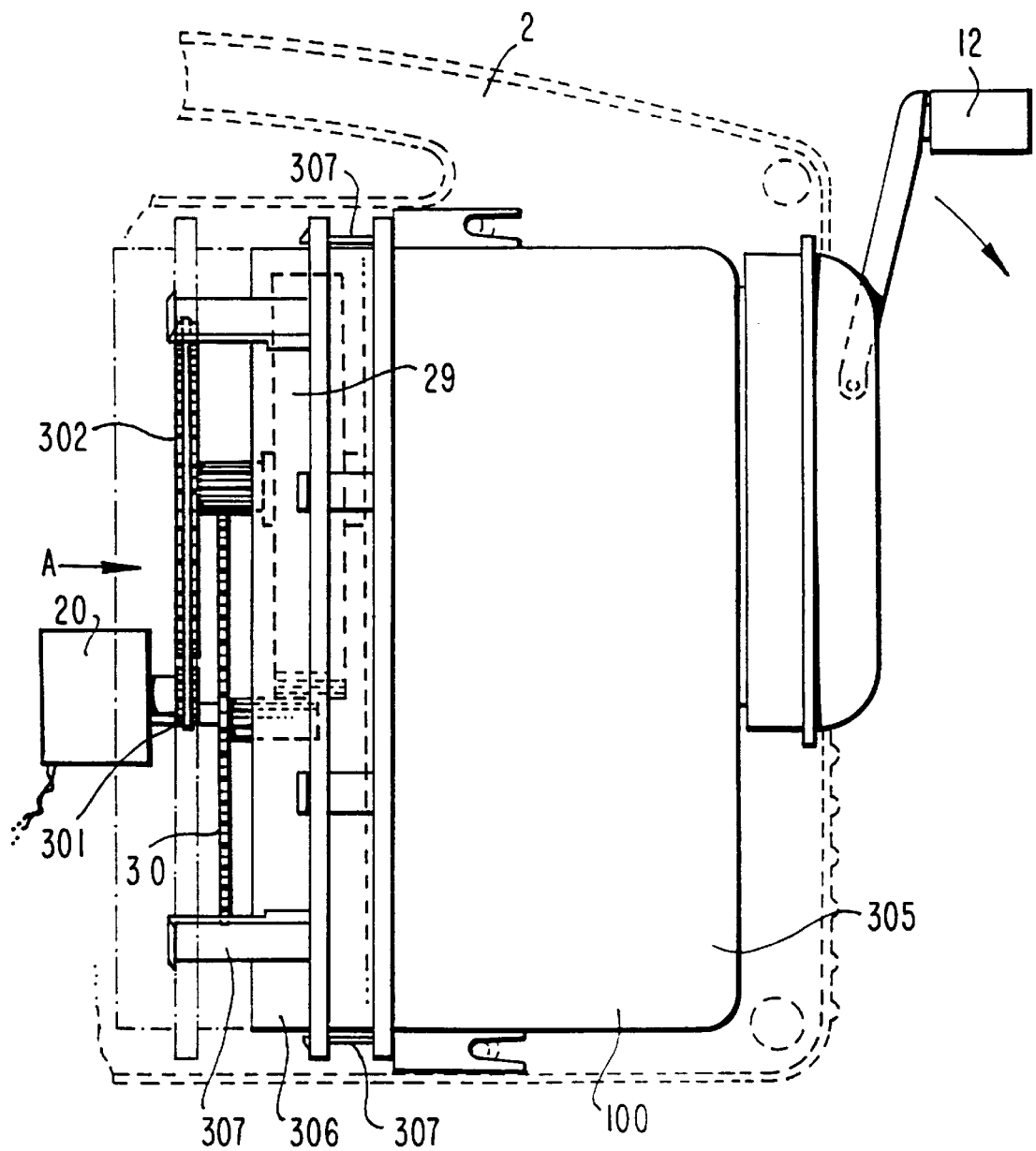
FIG. 11 is a part sectional view of a second embodiment of a power cassette.
Figure 12:
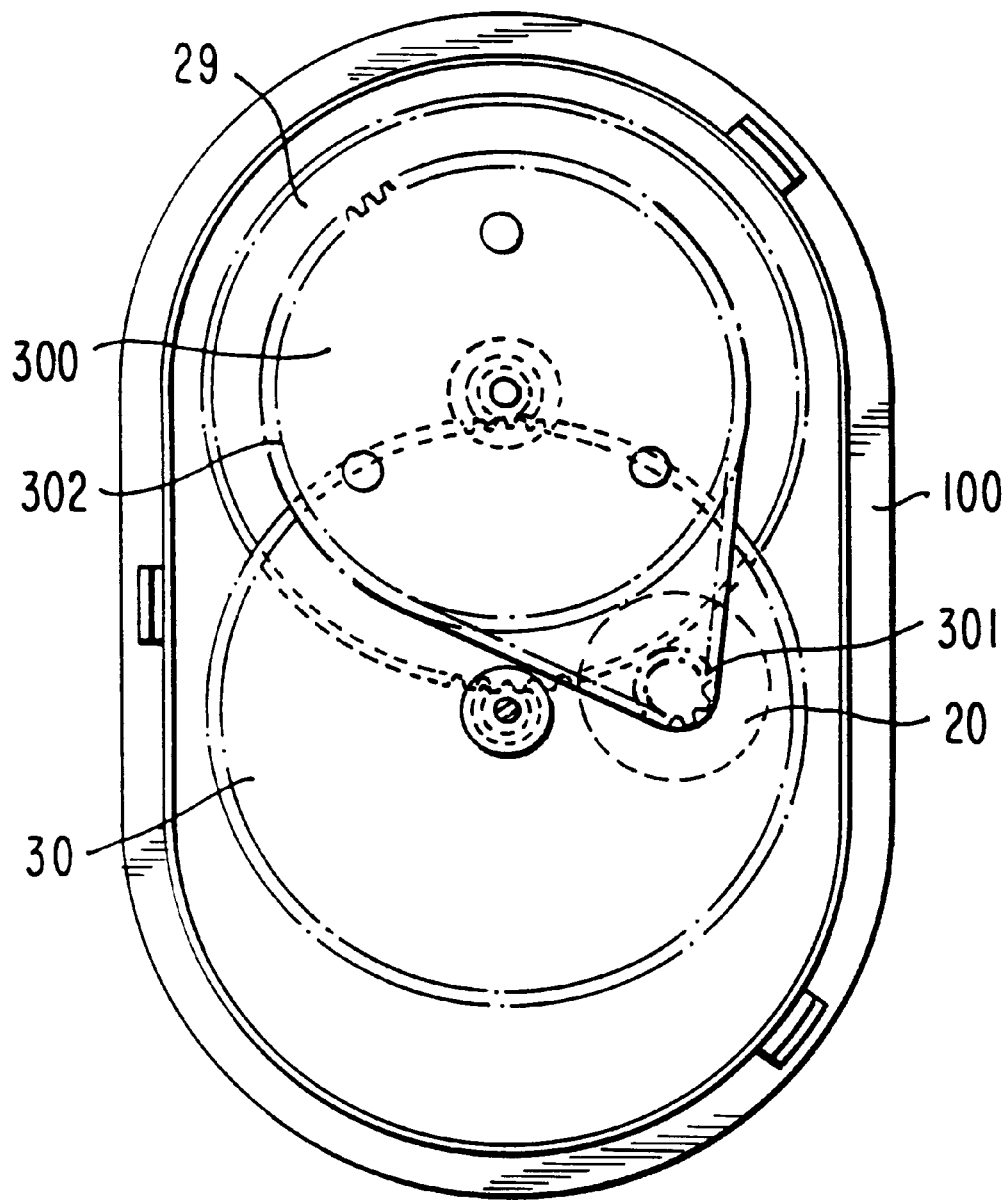
FIG. 12 is a plan view of the output gear and pulley train of the cassette of FIG. 11.

FIGS. 11 and 12 show details as to how the cassette can be clamped in the radio body and also of an alternative version of providing a final drive to the generator motor. In this embodiment the final drive to the motor 20 is not provided by an output gear of the kind described in FIGS. 5, 6 and 7. Until this final drive the gear arrangement of this embodiment is similar to that of the earlier embodiment. In this embodiment the final drive is a compound gear and pulley. Thus, the second gear wheel drives a pulley wheel 300 connected to a pulley 301 on the drive shaft of the motor 20 by means of a pulley belt 302. The pulley belt can be a standard tape cassette belt and is held slightly under tension to avoid slippage. The pulley wheel 300 has to be completely flat with a deep groove and lip to stop it throwing the belt.

FIG. 11 also shows the handle 12 in its winding position. The cassette comprises a main body 305 housing the spring, a central portion shown at 306 on which the final drive wheel and pulley is mounted and a lid portion 307 in which the motor 20 is mounted. All three portions are made from thermoplastics material and can be clipped together by means of integrally moulded sprung projection mating with apertures in ridges 308, 309 and 310.

It will also be appreciated that the pulley belt may be toothed with appropriate teeth provided on the two pulleys. This is indicated in FIG. 12.

It will be appreciated that the foregoing description has been directed to a portable radio with a removable spring powered generator cassette. It is, of course, entirely possible for the generator to be used for a wide range of other applications. Such applications could, of course, include charging batteries, providing power for other electronic equipment such as computers or calculators or even providing power for games equipment. It is, of course, not necessary for the actual mechanical source of power to be a spring of the nature described with regard to the preceding embodiments. The spring could be of an alternative material as there are now some extremely strong elastomeric materials which could be used to provide the motive power. It is additionally possible for the motive power to be provided by a compressed gas source expelling the gas through a suitable converter which converts the energy of the escaping gas into rotational energy for driving a generator. If the gas were air then a suitable pump would be provided in order to compress the gas for subsequent use.

Figure 14:
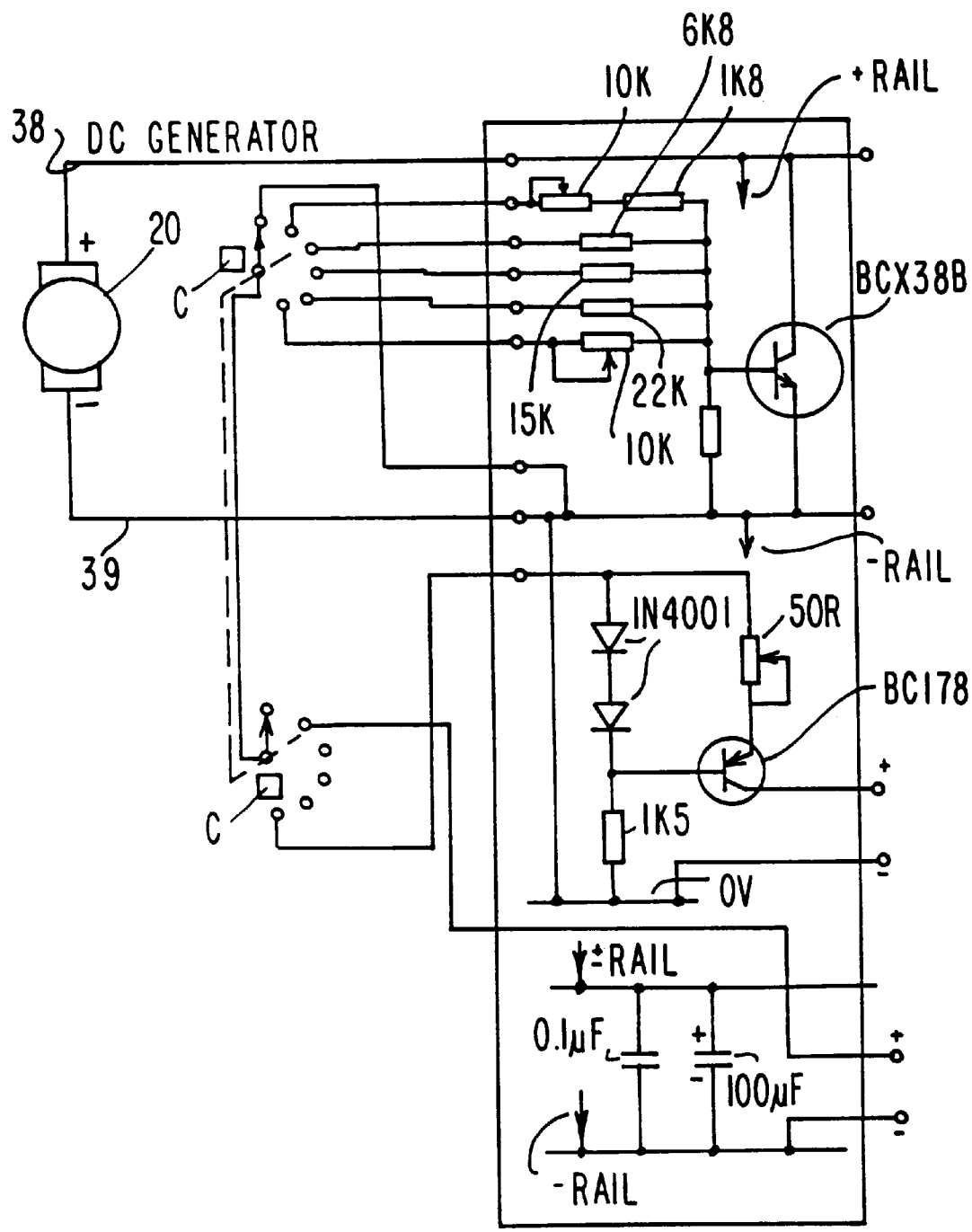
FIG. 14 is a circuit diagram of another embodiment.

Referring now to FIG. 14 of the drawings, this shows a second embodiment of the invention in which the spring mechanism and associated gearbox can be used for a multi-purpose device.

In this embodiment integers which are common to the previously described embodiment have been given the same reference numerals. Thus a DC generator driven by a gear train similar to gear train 19 provides its output on a positive rail 38 and a ground rail 39, a switch 70 has seven positions namely off, radio, two volts, three volts, four volts, battery charger. It will be appreciated that the various functions controlled by the switch have been given merely by way of illustration and that a wider or smaller range of outputs can be provided. The circuit shown in FIG. 11 effectively has three outputs namely one for battery charging, one for external uses and one for driving a radio of the kind described with regard to FIG. 1.

I claim:

1. A generator device for providing a controlled electric output current to a load, comprising: a source of mechanical energy; a rotatable handle connected to said source configured to increase the mechanical energy of the source through rotation of the handle; a gear train having a large gear ratio, connected to the source a generator connected to the gear train; and a control circuit connected to the generator; wherein the control circuit is configured to prevent an uncontrolled release of mechanical energy from the source by controlling a voltage output of the generator.

2. A generator as claimed in claim 1, and including means for fine-tuning the output of the gear train to the input of the generator for maximising the efficiency of the transmission of the energy, said fine tuning means comprising an output drive gear, a generator gear meshed with said output drive gear and coupled to said generator, and an eccentric mounting for one of said drive gear and said generator gear whereby the degree of mesh between the two trains can be adjusted by adjusting the mounting.

3. A generator device according to claim 1, wherein the output of the gear train comprises a pulley driving a spindle coupled to the drive shaft of the generator.

4. A generator device according to claim 3, wherein the belt and the spindle are toothed.

5. A generator as claimed in claim 1, wherein the control circuit comprises first and second output rails connected across said generator, a zener diode connected between said output rails, and a pair of resistors acting as a voltage divider to provide a reference voltage to the zener diode.

6. A generator according to claim 1, and including means for setting the output voltage to the load.

7. A generator according to claim 1, wherein the power source comprises a spring connected to respective storage and torque drums.

8. A generator according to claim 1 in combination with a radio, the generator being removable from the radio body.

9. A combination according to claim 8, wherein the radio body is moulded in two halves from thermoplastics material which together define a cavity within which the generator is mounted.

10. A combination according to claim 8, wherein the radio body is provided with inwardly projecting ribs which hold the generator in place within the radio when the two halves are secured together.

11. A portable electric device comprising:

a generator having a rotatable shaft;

a gear train having a first gear and a last gear, said last gear being coupled to said rotatable shaft;

a mechanical energy storage device coupled to said first gear, said mechanical energy storage device storing mechanical energy and selectively releasing said mechanical energy therefrom;

a handle coupled to said source, whereby rotating said handle adds mechanical energy to said source;

a power control circuit coupled to said generator and configured to prevent an uncontrolled release of said mechanical energy from said source by controlling a voltage output of said generator; and, a radio coupled to said power control circuit.

12. A generator device for providing a controlled electric output current to a load, comprising:

a source of mechanical energy;

a gear train connected to the source;

a generator connected to the gear train; and a control circuit connected to the generator;

wherein the control circuit is configured to prevent an uncontrolled release of mechanical energy from the source by controlling a voltage output of the generator;

wherein the control circuit comprises positive and negative output wires extending from the generator, and a brake circuit for electronically braking the generator by shorting the generator output when the voltage output rises above a predetermined value, wherein the brake circuit comprises a transistor, the base electrode of which is controlled by the voltage from the positive wire of the generator, a storage capacitor connected across the positive and negative output wires of the control circuit, and wherein the transistor is switched on when the output exceeds said predetermined value.

13. A generator device for providing a controlled electric output current to a load, comprising:

a source of mechanical energy;

a gear train connected to the source;

a generator connected to the gear train; and a control circuit connected to the generator;

wherein the control circuit is configured to prevent an uncontrolled release of mechanical energy from the source by controlling a voltage output of the generator;

wherein the control circuit comprises a pair of input terminals, a pair of output terminals, an output capacitor connected across said pair of output terminals, switch means adapted to monitor the output of the generator, a clamp circuit responsive to the switch means for clamping the output of the source of mechanical energy by applying a short circuit to the generator output, and a power switch operative when the clamp circuit is clamping the generator output to isolate the capacitor from the generator output and when the clamping circuit is not clamping the generator output to enable the generator output to charge the capacitor and to provide output to the load.

* * * * *